(12) United States Patent
Xue et al.

(10) Patent No.: US 11,654,743 B2
(45) Date of Patent: May 23, 2023

(54) LIQUID COOLING SEAL BOX, BOX COVER THEREOF, AND IN-VEHICLE COOLING SYSTEM

(71) Applicants: Inventec (Pudong) Technology Corporation, Shanghai (CN); INVENTEC CORPORATION, Taipei (TW)

(72) Inventors: Dong-rui Xue, Shanghai (CN); Raijin Li, Taipei (TW); Xuefeng Chen, Shanghai (CN); Pinyi Xiang, Shanghai (CN)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 132 days.

(21) Appl. No.: 17/029,047

(22) Filed: Sep. 23, 2020

(65) Prior Publication Data

US 2021/0291618 A1   Sep. 23, 2021

(30) Foreign Application Priority Data

Mar. 19, 2020 (CN) .......................... 202010196253.6

(51) Int. Cl.
*B60H 1/00* (2006.01)
*B60H 1/32* (2006.01)

(52) U.S. Cl.
CPC ..... *B60H 1/00278* (2013.01); *B60H 1/00485* (2013.01); *B60H 1/00521* (2013.01); *B60H 1/3202* (2013.01); *B60H 1/32011* (2019.05); *B60H 2001/00307* (2013.01); *B60H 2001/00635* (2013.01)

(58) Field of Classification Search
CPC ............ B60H 1/00278; B60H 1/00485; B60H 1/00521; B60H 1/32011; B60H 1/3202; B60H 2001/00307; B60H 2001/00635; H05K 7/20236; H05K 7/203
See application file for complete search history.

(56) References Cited

U.S. PATENT DOCUMENTS

| 10,765,033 | B1* | 9/2020 | Keehn ..................... H05K 7/203 |
| 2015/0109735 | A1* | 4/2015 | Campbell ............ H05K 7/2079 361/700 |
| 2016/0286694 | A1* | 9/2016 | Krishnan ........... H05K 7/20836 |
| 2018/0020570 | A1* | 1/2018 | Fujiwara ............ H05K 7/20318 |
| 2019/0387641 | A1* | 12/2019 | Aoki .................. H05K 7/20409 |
| 2020/0337176 | A1* | 10/2020 | Aoki .................. H05K 7/20327 |

* cited by examiner

*Primary Examiner* — David J Teitelbaum

(57) ABSTRACT

The present disclosure provides a liquid cooling seal box, a box cover thereof, and an in-vehicle cooling system. The liquid cooling seal box includes a sealed heat conduction box body, an inner cavity of the heat conduction box body includes a heating device and an insulating liquid in which the heating device is immersed, the insulating liquid absorbs heat of the heating device and vaporizes, vaporized steam rises to the top of the inner cavity of the heat conduction box body to be cooled and liquefied, and a liquefied insulating liquid falls back into the insulating liquid at the bottom of the inner cavity. The liquid cooling seal box of the present disclosure resolves problems of reliability, harsh environment, balance of volume and computation power, etc., is suitable for an in-vehicle system, and may implement stable and reliable running of a server in an in-vehicle environment.

9 Claims, 7 Drawing Sheets

LIQUID COOLING SEAL BOX, BOX COVER THEREOF, AND IN-VEHICLE COOLING SYSTEM

CROSS REFERENCES TO RELATED APPLICATIONS

This application claims the benefits of priority to Chinese Patent Application No. CN 2020101962536, entitled "Liquid Cooling Seal Box, Box Cover thereof, and In-Vehicle Cooling System", filed with CNIPO on Mar. 19, 2020, the contents of which are incorporated herein by reference in its entirety.

TECHNICAL FIELD

The present disclosure belongs to the technical field of intelligent driving, relates to an in-vehicle cooling, and in particular, to a liquid cooling seal box, a box cover thereof, and an in-vehicle cooling system.

BACKGROUND

With the rapid development of emerging technologies such as intelligent driving, 5G, and block chain, the size of the edge server market is growing rapidly. However, the edge server market currently still has challenges in many aspects such as deployment environment, security, durability, calculation density, compatibility, and generality, affecting use effect and experience of a user.

First, hash environments such as high temperature, high humidity, and high dust pose a strict test on an edge server. The conventional solution is to adopt full air cooling, but full air cooling solution cannot meet the requirement that the edge server needs to maintain stable and reliable running for 7*24 hours.

Second, the volume and the IT computation power of the edge server are difficult to balance, and a specific volume is required to accommodate the cooling system.

Third, the compatibility and generality of the edge server are poor and need to be customized.

Conventional air cooling is high in noise and supports a low heat flux density. Conventional two-phase liquid cooling is insufficient in sealing performance, a liquid loss rate is high. Conventional cold plate has a leakage problem and low reliability. Therefore, it is urgent to provide a good running environment for the edge server.

SUMMARY

The present disclosure provides a liquid cooling seal box, a box cover thereof, and an in-vehicle cooling system, to provide a reliable and stable running environment for an edge server.

The present disclosure provides a liquid cooling seal box. The liquid cooling seal box includes a sealed heat conduction box body, an inner cavity of the heat conduction box body includes a heating device and an insulating liquid in which the heating device is immersed, the insulating liquid absorbs heat of the heating device and vaporizes, vaporized steam rises to the top of the inner cavity of the heat conduction box body to be cooled and liquefied, and a liquefied insulating liquid falls back into the insulating liquid at the bottom of the inner cavity.

In an embodiment of the present disclosure, the heat conduction box body includes: a box cover, a box body, sealed and locked with the box cover to form the sealed heat conduction box body, an air-tight joint, disposed on a side wall of the box body and configured to communicate the liquid cooling seal box with outside, supply the insulating liquid to the liquid cooling seal box or/and vacuum the liquid cooling seal box, and a safety valve, disposed on a side wall of the box body and configured to release air pressure in the inner cavity of the heat conduction box body.

In an embodiment of the present disclosure, the box cover is a cold plate, an edge of the cold plate includes a fixing hole, and the cold plate is sealed and locked with the box body through the fixing hole and a fixing member.

In an embodiment of the present disclosure, a sealing surface of the box cover includes a condenser coil, and a joint of the condenser coil is disposed on an outer surface of the box cover.

In an embodiment of the present disclosure, the box cover has a flange structure, and a top side face of the flange structure includes a liquid cavity.

In an embodiment of the present disclosure, a top edge of the box body is provided with a trench, and a sealing gasket is filled in the trench.

In an embodiment of the present disclosure, the box body is a cold plate shell.

In an embodiment of the present disclosure, the air-tight joint has a detachable panel structure.

In an embodiment of the present disclosure, the air-tight joint comprises an RJ45 sealing joint, an optical fiber sealing joint, a power sealing joint, a vacuuming joint, or/and a liquid adding opening.

In an embodiment of the present disclosure, an inner cavity of the heat conduction box body includes a liquid level meter, a pressure sensor, or/and a temperature sensor.

In an embodiment of the present disclosure, the heating device is fixedly disposed on the bottom or the side wall of the inner cavity of the heat conduction box body through a connecting member.

The present disclosure further provides a box cover of a liquid cooling seal box, matching a box body to form the liquid cooling seal box, where the box cover is a cold plate.

In an embodiment of the present disclosure, a sealing surface of the cold plate includes a condenser coil, and a joint of the condenser coil is disposed on an outer surface of the box cover.

In an embodiment of the present disclosure, an edge of the cold plate includes a fixing hole, and the cold plate is sealed and locked with the box body through the fixing hole and a bolt.

In an embodiment of the present disclosure, the cold plate has a flange structure, and a top side face of the flange structure includes a liquid cavity.

The present disclosure further provides an in-vehicle cooling system, including a liquid cooling seal box, comprising a sealed heat conduction box body, an inner cavity of the heat conduction box body includes a heating device and an insulating liquid in which the heating device is immersed, the insulating liquid absorbs heat of the heating device and vaporizes, vaporized steam rises to the top of the inner cavity of the heat conduction box body to be cooled and liquefied, and a liquefied insulating liquid falls back into the insulating liquid at the bottom of the inner cavity; and a heat dissipation system, configured to dissipate the heat of the heat conduction box body.

In an embodiment of the present disclosure, the heating device comprises an in-vehicle server, the in-vehicle server intelligently calculates a liquid level of the insulating liquid during pressure relief according to a safety valve of the liquid cooling seal box, calculates the volume of a vaporizable insulating liquid, then calculates vaporization per second according to vaporization heat of the insulating liquid and power consumption of the in-vehicle server, and calculates a remaining running time of the in-vehicle server.

In an embodiment of the present disclosure, the heat dissipation system comprises an in-vehicle air-conditioning system or an independent air cooling system, and the liquid cooling seal box is located in an air duct of the in-vehicle air-conditioning system or the independent air cooling system.

In an embodiment of the present disclosure, the heat dissipation system comprises an in-vehicle battery pack liquid cooling system or an independent liquid cooling system, the heat conduction box body comprises a cold plate surface, and a liquid cooling inlet and a liquid cooling outlet of the cold plate surface are both connected with the in-vehicle battery pack liquid cooling system or the independent liquid cooling system.

In an embodiment of the present disclosure, a box cover of the heat conduction box body is the cold plate surface, a sealing surface of the box cover includes a condenser coil, and a joint of the condenser coil is connected with the in-vehicle battery pack liquid cooling system or the independent liquid cooling system.

In an embodiment of the present disclosure, a box body of the heat conduction box body is at least one cold plate surface, a sealing surface or an interlayer of the cold plate surface includes a condenser coil, and a joint of the condenser coil is connected with the in-vehicle battery pack liquid cooling system or the independent liquid cooling system.

In an embodiment of the present disclosure, at least two liquid cooling seal boxes share one heat dissipation system.

As described above, the liquid cooling seal box, the box cover thereof, and the in-vehicle cooling system according to the present disclosure have the following beneficial effects: the liquid cooling seal box of the present disclosure resolves the problems of reliability, harsh environment, balance of volume and computation power, and the like, is suitable for an in-vehicle system, and may implement stable and reliable running of a server in an in-vehicle environment.

COMPONENT REFERENCE NUMERALS

Figure 1:
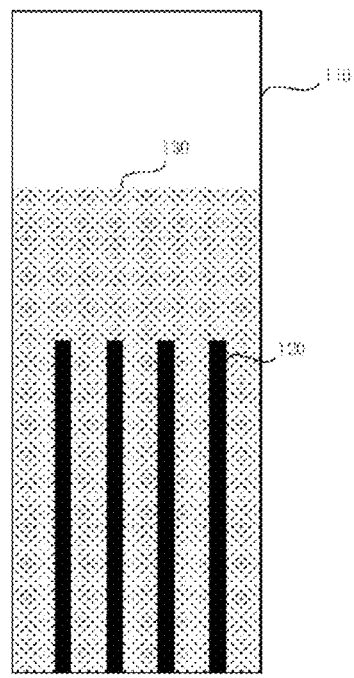
FIG. 1 is a schematic diagram of a liquid cooling seal box according to an embodiment of the present disclosure.

100 Liquid cooling seal box
110 Heat conduction box body
111 Box cover
112 Box body
1121 Trench
1122 Sealing gasket
113 Air-tight joint
114 Safety valve
120 Heating device
130 Insulating liquid
300 Cold plate
310 Fixing hole
320 Condenser coil
321 Inlet joint
322 Outlet joint
330 Liquid cavity
600 In-vehicle cooling system
610 Heat dissipation system

DETAILED DESCRIPTION OF THE PREFERRED EMBODIMENTS

The following describes implementations of the present disclosure by using specific embodiments. A person skilled in the art may easily understand other advantages and effects of the present disclosure from the content disclosed in this specification. The present disclosure may also be implemented or applied through different specific embodiments. Various details in this specification may also be modified or changed based on different viewpoints and applications without departing from the spirit of the present disclosure. It should be noted that the embodiments below and features in the embodiments can be combined with each other in the case of no conflict.

It should be noted that the drawings provided in the following embodiments only exemplify the basic idea of the present disclosure. Therefore, only the components related to the present disclosure are shown in the drawings, and are not drawn according to the quantity, shape, and size of the components during actual implementation. During actual implementation, the type, quantity, and proportion of the components may be changed, and the layout of the components may be more complicated.

Referring to FIG. 1, the present disclosure provides a liquid cooling seal box. The liquid cooling seal box 100 includes a sealed heat conduction box body 110. The heat conduction box body 110 includes a heating device 120 and an insulating liquid 130 in which the heating device 120 is immersed in an inner cavity of the heat conduction box body 110. The insulating liquid 130 absorbs heat of the heating device 120 and vaporizes, vaporized steam rises to the top of the inner cavity of the heat conduction box body to be cooled and liquefied, and a liquefied insulating liquid falls back into the insulating liquid at the bottom of the inner cavity.

The liquid cooling seal box of the present disclosure adopts a full sealing structure, a two-phase immersion technology, and a cold plate technology. The liquid cooling seal box is divided into a liquid immersion area and a steam area. The heating device 120 is immersed into a low boiling point cooling medium (that is, the insulating liquid, for example, 3M fluorinated liquid FC-72, FC-3284, Novec7000, Novec7100, or low boiling point fluorinated liquids of other brands), the low boiling cooling medium boils on the surface of the heating device 120 and absorbs heat, the rising steam meets the top of the liquid cooling seal box (the top generally refers to a part of the box body with a lower temperature in the steam area of the liquid cooling seal box, including a top cover of the liquid cooling seal box or/and a part of the side wall close to the top cover) and is condensed and falls back, heat is taken away by an external cooling system. The heating device 120 (that is, an internal component) may have a stack structure, the size may be reduced by more than 50%, thus space is saved.

According to Newton's law of heat, heat is transferred from a high temperature area to a low temperature area. When an ambient temperature is higher than a boiling temperature, heat cannot be transferred out. A liquid in the liquid immersion area boils and evaporates, a minimum solution volume (referring to a formula 1) may be calculated according to the volume of the box body, the selected solution, and the required boiling temperature (referring to a formula 2).

Clausius-Claperon equation: $d \ln p/d(1/T) = \delta \ln p/\delta (1/T) = -H(v)/(R*Z(v))$      formula 1)

Antoine equation: $lg\ p = A - B/(T+C)$      formula 2)

H(v) is evaporation heat in J/mol, Z(v) is a difference between a saturated steam compression factor and a saturated liquid compression factor, R is a gas constant, $\delta \ln p/\delta(1/T) = -H(v)/(R*Z(v))$ indicates a functional relationship between temperature and pressure, p is a vapor pressure Pa, A, B, and C are Antoine constants, which may be looked up from a data table, and T is temperature in K.

After gasification, the volume of the liquid is expanded by more than a hundred times, and the gas in the steam area is increased. Meanwhile, due to the compressibility of the gas, the pressure in the steam area in the seal box body rises, the saturated concentration of the steam per unit volume rises, the saturated steam pressure rises, and a boiling point of the liquid rises (referring to formula 2), thereby adapting to a working environment higher than the boiling point of FC-72.

Heat exchange efficiency of liquid during phase change is hundreds of times that of air cooling, and a server with a high heat density may be supported by combining with an external cooling system. Therefore, a cavity of the liquid cooling seal box of the present disclosure adopts passive two-phase immersion liquid cooling (a heat dissipation system, that is, the liquid cooling seal box, has no energy consumption and passively exchanges heat with outside, therefore, is referred to as passive two-phase immersion liquid cooling, and active two-phase immersion liquid cooling refers to that the heat dissipation system has energy consumption and mainly performs a heat exchange action), a heating device (or an electronic component) is immersed in a low-boiling point insulating liquid, and the surface of the heating device is in direct contact with the insulating liquid. The insulating liquid absorbs heat of the heating device and vaporizes, and the steam raises to the steam area, is cooled and liquefied by a cooling part of the top of the liquid cooling seal box, and falls back to the liquid area. Compared with pure air cooling, the present disclosure has high heat exchange capability, the heating device does not have a hotspot problem of some components caused by uneven air flow in the air cooling process.

Figure 2:
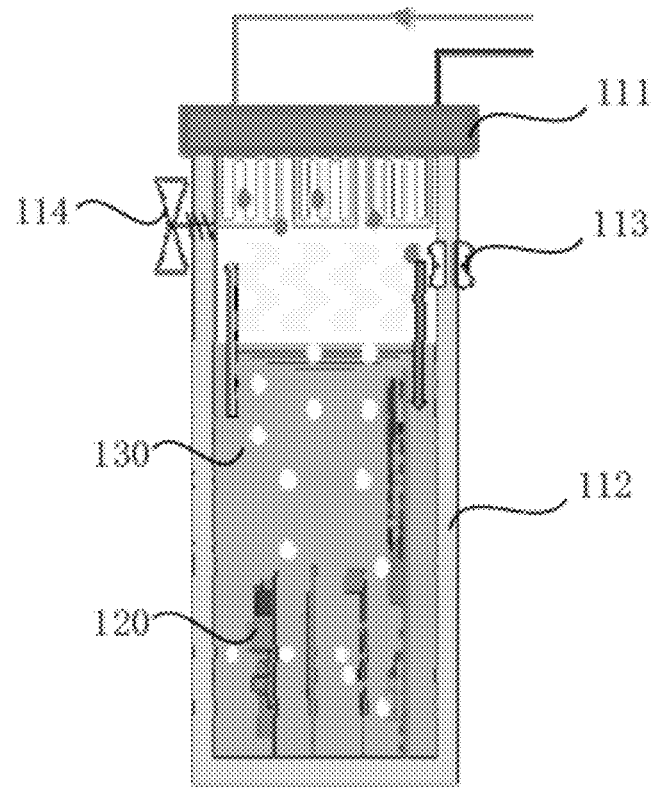
FIG. 2 is a schematic diagram of a heat conduction box body of the liquid cooling seal box according to an embodiment of the present disclosure.

In an embodiment of the present disclosure, referring to FIG. 2, the heat conduction box body 110 includes a box cover 111, a box body 112, an air-tight joint 113, or/and a safety valve 114.

The box body 112 and the box cover 111 are sealed and locked or integrally formed to form the sealed heat conduction box body 110. When the box body 112 and the box cover 111 are detachable, the box cover may be conveniently replaced, to reduce maintenance costs of the heat conduction box body.

The air-tight joint 113 is disposed on a side wall of the box body 112, and configured to implement communication between the liquid cooling seal box and the outside, supply of the insulating liquid of the liquid cooling seal box, or/and vacuuming of the liquid cooling seal box. In an embodiment of the present disclosure, the air-tight joint 113 may include an RJ45 sealing joint, an optical fiber sealing joint, a power sealing joint, a vacuuming joint, or/and a liquid adding opening. The RJ45 sealing joint is configured to implement communication between the liquid cooling seal box and the outside, the power sealing joint is configured to implement the power supply to the liquid cooling seal box, the vacuuming joint is configured to implement the vacuuming of the liquid cooling seal box, and the liquid adding opening is configured to implement the supply of the insulating liquid of the liquid cooling seal box.

Figure 3A:
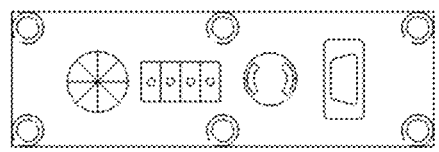
FIG. 3A and FIG. 3B are schematic diagrams of an air-tight joint of the liquid cooling seal box according to an embodiment of the present disclosure.
Figure 3B:
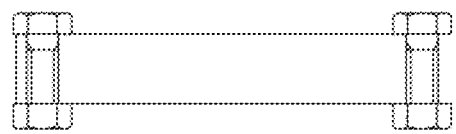

In an embodiment of the present disclosure, referring to FIG. 3A and FIG. 3B, the air-tight joint 113 is a detachable panel structure. The air-tight joint 113 with the detachable panel structure is convenient to replace and flexible to use, and the maintenance costs of the liquid cooling seal box is greatly reduced.

The safety valve 114 is disposed on a side wall of the box body 112, and is configured to release air pressure in the inner cavity of the heat conduction box body. Due to liquid gasification, the volume of the liquid is expanded by more than a hundred times, and the amount of gas in the steam area is increased. Meanwhile, due to the compressibility of the gas, the pressure in the steam area in the sealed box body rises, and if heat of the liquid cooling seal box cannot be smoothly taken away by an external cooling system and the pressure in the sealed box body continuously rises, great danger will be caused. The design of the safety valve 114 can exactly resolve the safety risk problem caused by a rapid rise of the air pressure. That is, when a fault occurs in the external cooling system, the insulating liquid in the liquid cooling seal box continuously evaporates and overflows through the safety valve, so that the pressure in a container of the liquid cooling seal box is maintained at safe pressure. Moreover, the heating device may still run for a period of time before the insulating liquid boils and evaporates to a safe liquid level height, and the length of the time is related to a load of the heating device (for example, an edge server).

The supported highest boiling point of the liquid (that is, the insulating liquid) TL is: TL=Tspec−TDP×H. Tspec indicates a temperature of each component, TDP indicates the power consumption of each component, and H represents a boiling heat exchange efficiency coefficient of a heat exchanger. A temperature difference between the liquid temperature and the component (that is, the heating device) temperature is ST=H×TDP, so that the supported highest boiling point of the liquid TL may be calculated, and H may be obtained through an experimental test.

The heating device (for example, the edge server) may calculate a liquid level of the insulating liquid during pressure relief according to the safety valve (or referred to as a pressure relief valve), calculate the volume of a vaporizable insulating liquid, and calculate evaporation per second according to vaporization heat of the insulating liquid and the power consumption of the heating device, thereby calculating a remaining running time of the heating device.

Further, the heating device (for example, the edge server) may automatically determine the nature of the insulating liquid according to the device code, calculate a safe running time in the current state, and then automatically turn off or perform frequency reduction on an in-vehicle computer (that is, the edge server) according to the time of automatic driving to a safe parking position when necessary.

In an embodiment of the present disclosure, the heat conduction box body 110 includes a liquid level meter, a pressure sensor, or/and a temperature sensor in the inner cavity. The liquid level meter is configured to measure the insulating liquid 130 in the heat conduction box body 110. The pressure sensor is configured to measure air pressure in the inner cavity of the heat conduction box body 110. The temperature sensor is configured to measure temperature and humidity in the heat conduction box body 110.

Figure 4A:
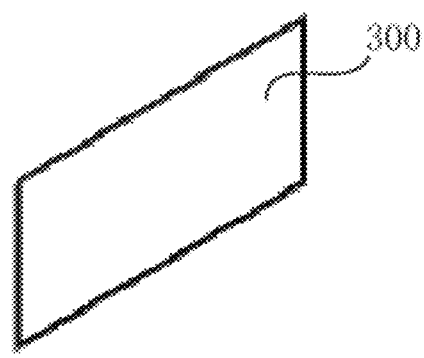
FIG. 4A to FIG. 4D are schematic diagrams of a box cover of the liquid cooling seal box according to an embodiment of the present disclosure.

Referring to FIG. 4A, the box cover 111 is a cold plate 300 and configured to match a box body to form a liquid cooling seal box. The cold plate 300 may be externally connected to a cooling system, so that heat of the liquid cooling seal box is conducted to the outside through the cold plate 300.

Figure 4B:
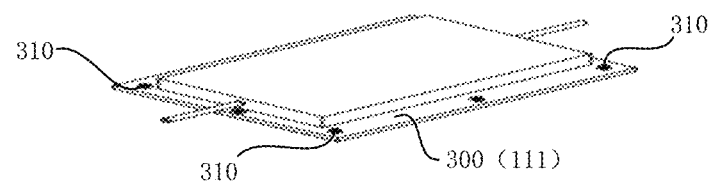

In an embodiment of the present disclosure, referring to FIG. 4B, an edge of the cold plate 300 contain a fixing hole 310, and the cold plate 300 is sealed and locked with the box body 112 through the fixing hole 310 and a fixing member. Further, the fixing member may be a bolt.

Figure 4C:
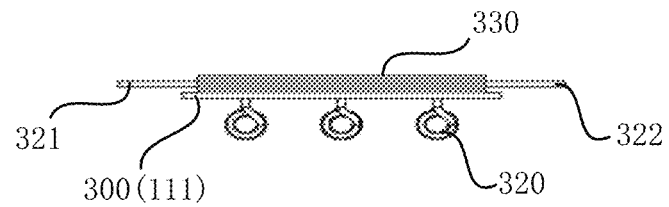
Figure 4D:
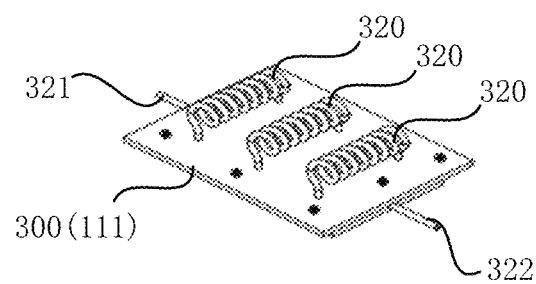

In an embodiment of the present disclosure, referring to FIG. 4C and FIG. 4D, a condenser coil 320 is disposed on a sealing surface of the box cover 111, and a joint of the condenser coil 320 is disposed on an outer surface of the box cover 111. The joint of the condenser coil 320 (including an inlet joint 321 and an outlet joint 322) is connected with an external cooling system. When flowing through the condenser coil 320, the cooling liquid will take away the heat of the liquid cooling seal box, and the cooling liquid will return to normal when flowing through the cooling system, and then the cooling liquid is recycled to the condenser coil 320 to continuously cool the liquid cooling seal box.

Further, in an embodiment of the present disclosure, the box cover 111 is a flange structure, and a liquid cavity 330 is disposed on a top side face of the flange structure. The liquid cavity 330 is configured to load cooling liquid. The liquid cavity 330 designed on the top side of the box cover 111 (also referred to as a top cover) may reduce a flow resistance.

In the design of the top cover of the condenser coil provided by this embodiment, the upper cover serves as the condenser coil, a coil pipeline and the top cover form an integral structure, and a top cover joint may adopt a pagoda joint or a quick joint.

Figure 5:
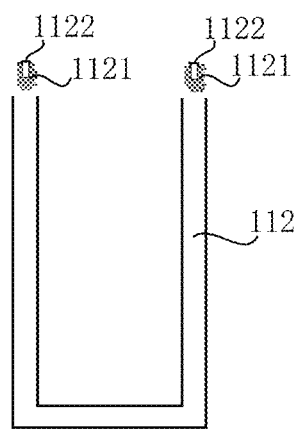
FIG. 5 is a schematic diagram of a box body of the liquid cooling seal box according to an embodiment of the present disclosure.

In an embodiment of the present disclosure, referring to FIG. 5, a top edge of the box body 112 includes a trench 1121, and a sealing gasket 1122 is filled in the trench 1121. According to the design, the box cover and the box body may be more sealed when being locked, and leakage is avoided. The box cover 111 is sealed with the box body 112, the box cover 111 (the cold plate) is isolated from the heating device 120 (an electronic component), and when the insulating liquid 130 leaks, there is no threat to the internal heating device 120 (the electronic device).

In an embodiment of the present disclosure, the box body 112 is a cold plate shell. The cold plate shell may conduct the heat of the liquid cooling seal box to the outside. Furthermore, the cold plate shell may be externally connected with a cooling system for heat dissipating, or the cold plate shell may naturally dissipate heat only relying on an ambient temperature without being externally connected to any cooling system. The cooling system may be liquid cooling or air cooling.

The liquid cooling seal box of the present disclosure may maintain the pressure on the two sides in the cavity and avoid leaking. In this embodiment, the box cover may adopt a flange structure, and the box cover surrounds the periphery of a sealing cavity and is locked with the cavity (the cavity of the liquid cooling seal box) through bolts. A top edge of the cavity includes a trench structure, a sealing gasket is filled in the trench, and a sealing structure is formed after the top cover is locked. The side may adopt a sealing joint or an air-tight joint, for example, an RJ45 sealing joint, an optical fiber sealing joint, and a power sealing joint. The joint may adopt a detachable panel structure and is fixed with the box body by using the flange structure. According to the present disclosure, the joint can be expanded according to requirements, and the compatibility problem of the edge server is resolved.

A side edge of the liquid cooling seal box may include a safety valve, so that the danger of overpressure in the cavity is avoided. The sealing structure of the liquid cooling seal box of the present disclosure solves the leakage problem of two-phase immersion liquid cooling and dust problem of the edge server.

In an embodiment of the present disclosure, the heating device 120 is fixedly disposed on the bottom or the side wall of the inner cavity of the heat conduction box body 110 through a connecting member. The scope of the present disclosure is not limited to a specific structure of the connecting member and a fixed position in the inner cavity.

The liquid cooling seal box of the present disclosure adopts a two-phase immersion liquid cooling technology and a cold plate liquid cooling technology, and solves the problems of reliability, harsh environment, balance of volume and computation power, and the like of an edge server. The liquid cooling seal box matching an in-vehicle server may be applied to the field of vehicles. A design solution of a two-phase immersion liquid cooling sealing edge server and a liquid cooling coil is to connect to an original cooling system of a vehicle in the form of the top cover of the condenser coil, and availability may be improved. The design solution is used as a solution to an in-vehicle server and has a wide application prospect.

In addition, the liquid cooling seal box may be connected with an in-vehicle cooling water system to support a high heat flux density. Internal components of the in-vehicle server may adopt a stack structure, and the volume is reduced by more than 50%. The top cover of the liquid cooling seal box is detachable, so that the box cover of the liquid cooling seal box is convenient to replace. In the top cover sealing structure, the cold plate and the components are isolated, and liquid leakage has no threat to the internal electronic components.

Figure 6:
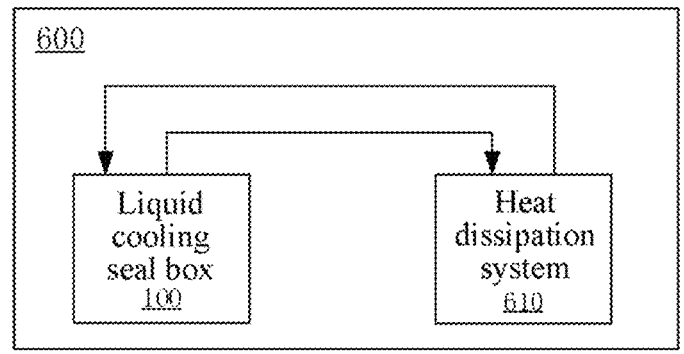
FIG. 6 is a block diagram of an in-vehicle cooling system according to an embodiment of the present disclosure.

Referring to FIG. 6, this embodiment further provides an in-vehicle cooling system. The in-vehicle cooling system 600 includes: a liquid cooling seal box 100 and a heat dissipation system 610.

Figure 7:
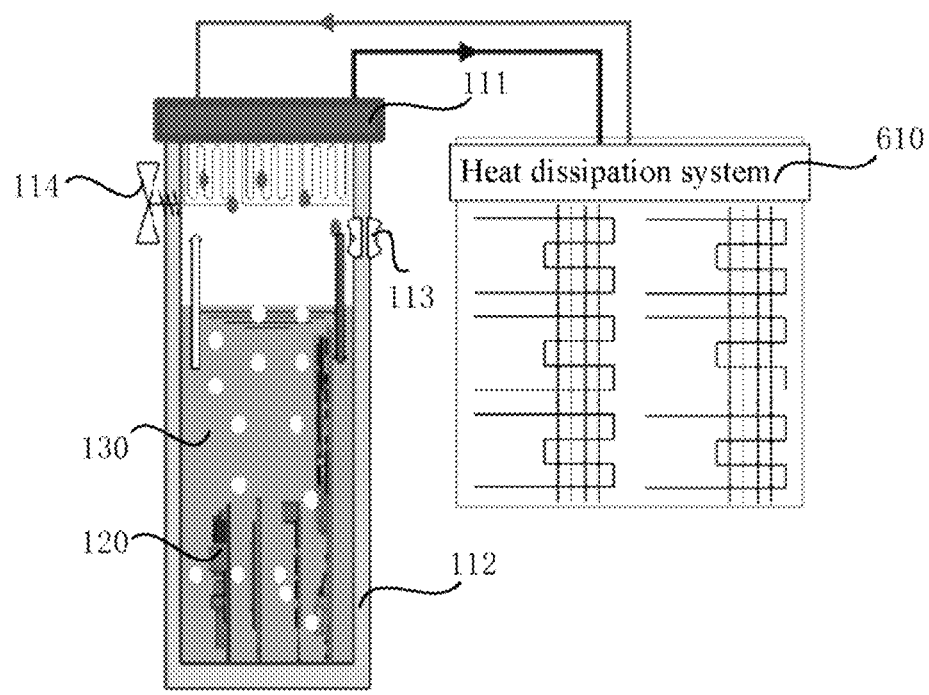
FIG. 7 is a schematic diagram of the in-vehicle cooling system according to an embodiment of the present disclosure.

The liquid cooling seal box 100 includes a sealed heat conduction box body 110. Referring to FIG. 7, the heat conduction box body 110 includes a heating device 120 and an insulating liquid 130 in which the heating device 120 is immersed in an inner cavity of the heat conduction box body 110. The insulating liquid 130 absorbs heat of the heating device 120 and vaporizes, vaporized steam rises to the top of the inner cavity of the heat conduction box body to be cooled and liquefied, and a liquefied insulating liquid falls back into the insulating liquid at the bottom of the inner cavity. The heat dissipation system 610 is configured to dissipate the heat of the heat conduction box body. A structure of the liquid cooling seal box 100 may adopt the structure design exemplified in FIG. 1 to FIG. 5 of the embodiments of the present disclosure.

Figure 8:
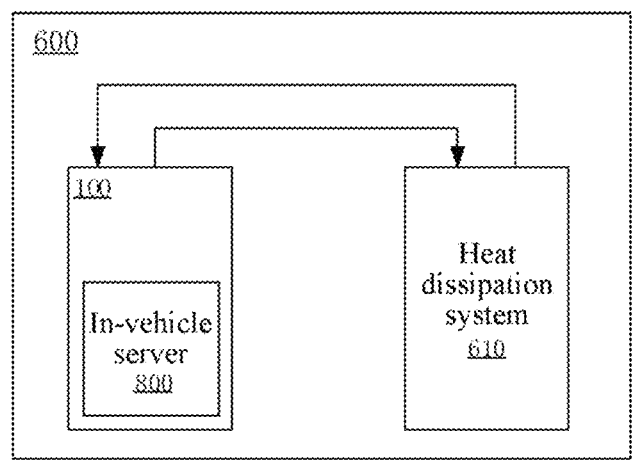
FIG. 8 is a schematic diagram of a cooling system of an in-vehicle server according to an embodiment of the present disclosure.
Figure 9:
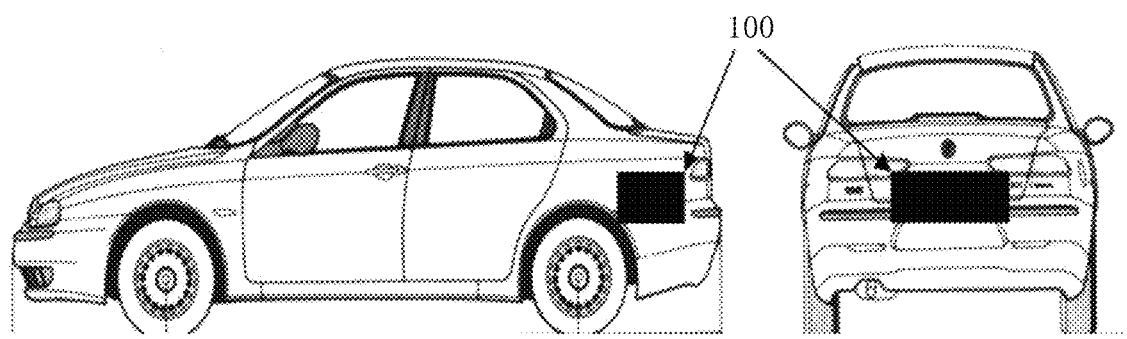
FIG. 9 is a schematic diagram of an exemplary installation position of the in-vehicle cooling system according to an embodiment of the present disclosure.

Referring to FIG. 8, when the heating device 120 includes an in-vehicle server 800, the in-vehicle cooling system 600 may be referred to as a cooling system of the in-vehicle server. Referring to FIG. 9, a liquid cooling seal box 100 internally containing an in-vehicle server 800 may be disposed in a trunk of a vehicle. The heat dissipation system 610 is an in-vehicle heat dissipation system.

In an embodiment of the present disclosure, the in-vehicle server 800 may intelligently calculate a liquid level of the insulating liquid during pressure relief according to a safety valve, so as to calculate the volume of a vaporizable insulating liquid, and then calculate vaporization per second according to vaporization heat of the insulating liquid and power consumption of the in-vehicle server, thereby calculating a remaining running time of the in-vehicle server.

Further, the in-vehicle server may automatically determine the nature of the insulating liquid according to the device code, calculate a safe running time in the current state, and then automatically turn off or perform frequency reduction on the in-vehicle server according to the time required for automatic driving to a safe parking position when necessary.

Figure 10:
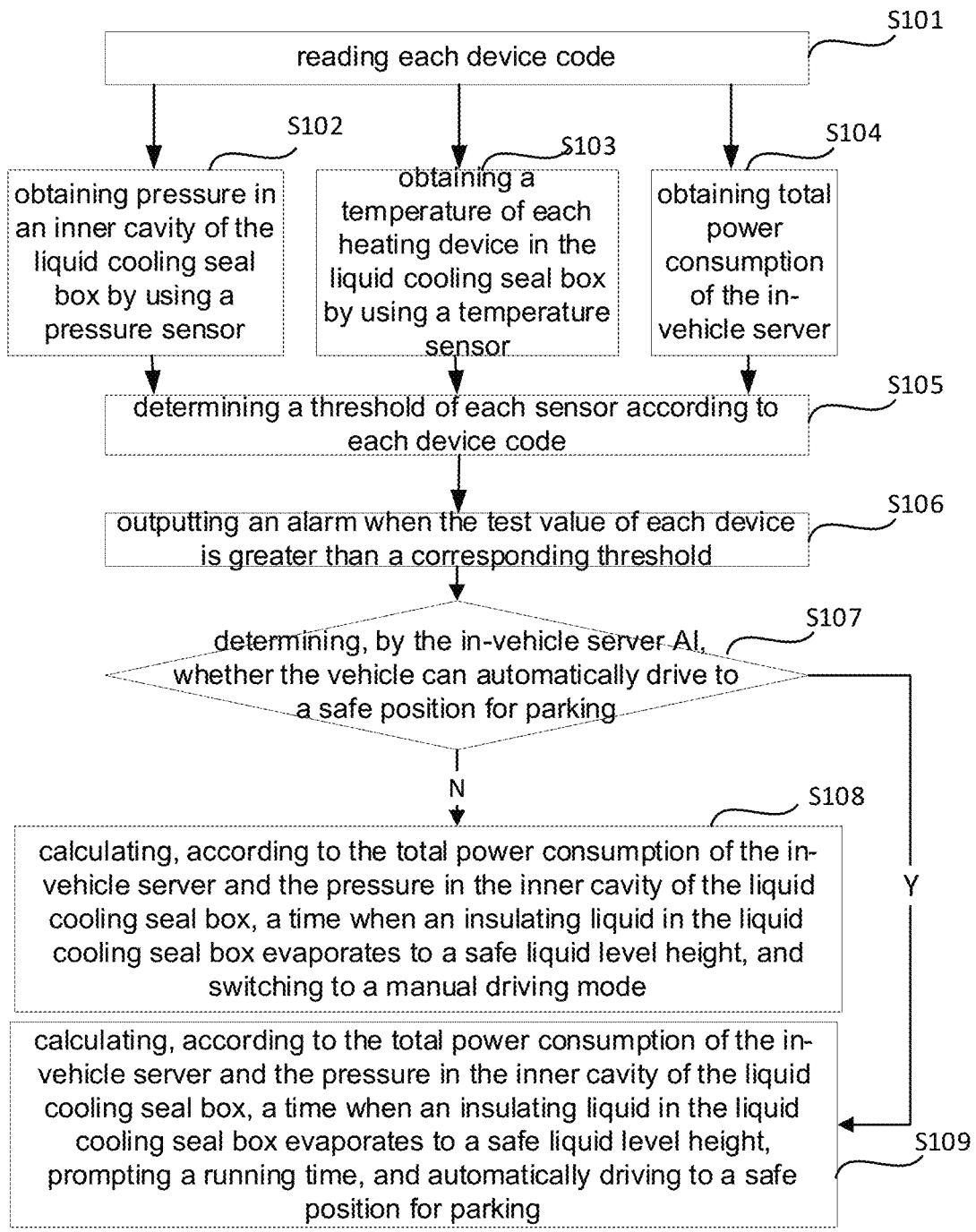
FIG. 10 is a schematic flowchart of an intelligent safety emergency method of the in-vehicle server according to an embodiment of the present disclosure.

Specifically, referring to FIG. 10, an intelligent safety emergency method of the in-vehicle server includes:

S101: reading each device code, the device includes a liquid cooling seal box, a heating device, etc.

S102: obtaining pressure in an inner cavity of the liquid cooling seal box by using a pressure sensor.

S103: obtaining a temperature of each heating device in the liquid cooling seal box by using a temperature sensor.

S104: obtaining total power consumption of the in-vehicle server.

S105: determining a threshold of each sensor according to each device code, the sensor includes a temperature sensor of each heating device or/and a pressure sensor of the inner cavity of the liquid cooling seal box.

S106: outputting an alarm when the test value of each device is greater than a corresponding threshold. The test value of the device includes a temperature value obtained through the temperature sensor or/and a pressure value of the inner cavity of the liquid cooling seal box obtained through the pressure sensor.

S107: determining, by the in-vehicle server artificial intelligence (AI), whether the vehicle can automatically drive to a safe position for parking.

S108: if no, calculating, according to the total power consumption of the in-vehicle server and the pressure in the inner cavity of the liquid cooling seal box, a time when an insulating liquid in the liquid cooling seal box evaporates to a safe liquid level height, and switching to a manual driving mode.

S109: if yes, calculating, according to the total power consumption of the in-vehicle server and the pressure in the inner cavity of the liquid cooling seal box, a time when an insulating liquid in the liquid cooling seal box evaporates to a safe liquid level height, prompting a running time, and automatically driving to a safe position for parking.

The in-vehicle server of the present disclosure has an artificial intelligence emergency function, when a fault occurs in a related cooling device in a running process of the in-vehicle server, an immersion liquid (that is, the insulating liquid) may provide a period of emergency time. In this case, an artificial intelligence program of the in-vehicle server participates in analysis and control, and analyzes and processes the device fault in a targeted manner according to an actual driving condition, to reduce unnecessary losses. In this case, the in-vehicle server may optimize resource allocation of all parts of the in-vehicle server by using the artificial intelligence program, calculate a safe running time, automatically control an in-vehicle system, and assist a driver in completing safe parking and maintenance.

In an embodiment of the present disclosure, the heat dissipation system 610 includes an in-vehicle air-conditioning system or an independent air cooling system. The liquid cooling seal box is located in an air duct of the in-vehicle air-conditioning system or the independent air cooling system.

In an embodiment of the present disclosure, the heat dissipation system 610 includes an in-vehicle battery pack liquid cooling system or an independent liquid cooling system. The heat conduction box body 110 includes a cold plate surface, and a liquid cooling inlet and a liquid cooling outlet of the cold plate surface are both connected with the in-vehicle battery pack liquid cooling system or the independent liquid cooling system. When the heat conduction box body 110 is connected with an in-vehicle cooling water system, the high heat flux density may be supported, and a running environment of the in-vehicle server is easily ensured.

In an embodiment of the present disclosure, a box cover 111 of the heat conduction box body 110 is the cold plate surface, a condenser coil is disposed on a sealing surface of the box cover, and a joint of the condenser coil is connected with the in-vehicle battery pack liquid cooling system or the independent liquid cooling system.

In an embodiment of the present disclosure, a box body 112 of the heat conduction box body 110 includes at least one cold plate surface, a condenser coil is disposed on a sealing surface or an interlayer of the cold plate surface, and a joint of the condenser coil is connected with the in-vehicle battery pack liquid cooling system or the independent liquid cooling system.

Figure 11:
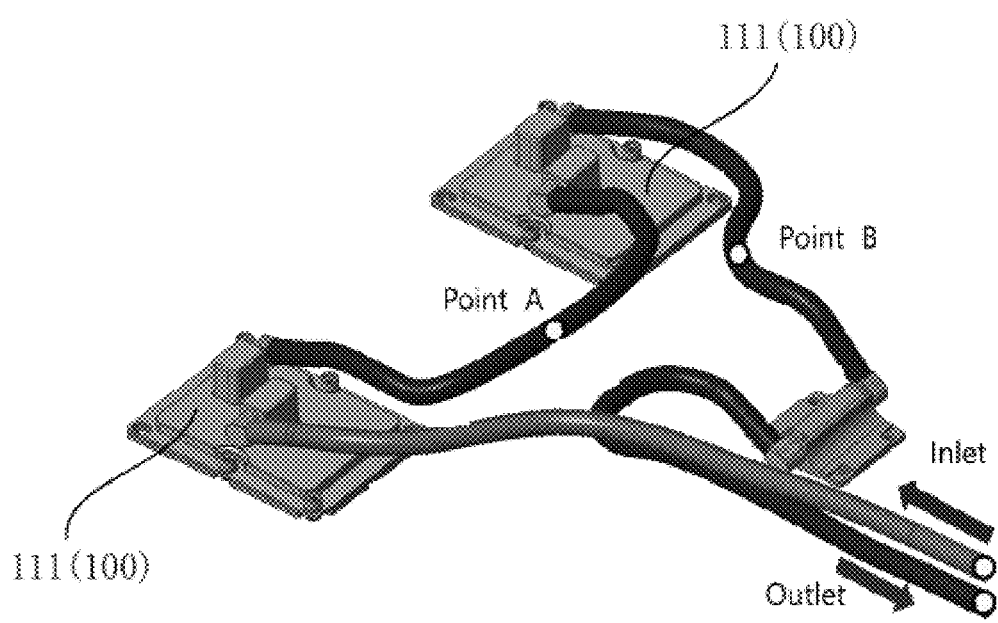
FIG. 11 is a schematic diagram of the in-vehicle cooling system according to another embodiment of the present disclosure.

In an embodiment of the present disclosure, referring to FIG. 11, at least two liquid cooling seal boxes 100 share one heat dissipation system 610.

The liquid cooling seal box of the present disclosure adopts a full sealing structure, meets an electronic protection level of IP68 (the highest level of a connector waterproof standard) or more, and has high reliability. A pressure-resistant sealing design is adopted, so that the problem of two-phase liquid evaporation loss is avoided. By adopting a fluorinated liquid phase change direct cooling mode, each electronic component has no hotspot problem, and the service life of the component is prolonged. A harsh environment may be supported, and the service life of the product is long. A boiling point is adjusted by using pressure, so that different use scenarios may be met. An environment in which a temperature is higher than the boiling point of the two-phase liquid may be supported. The electromagnetic interference is completely sealed and isolated, the EMC design is facilitated, and the EMC design costs are reduced.

The liquid cooling seal box of the present disclosure resolves problems of reliability, harsh environment, balance of volume and computation power, and the like, is suitable for in-vehicle system, and may implement stable and reliable running of a server in an in-vehicle environment.

In conclusion, the present disclosure overcomes various disadvantages in the prior art, and has a high industrial utilization value.

The above embodiments merely exemplify the principles and effects of the present disclosure, but are not intended to limit the present disclosure. A person skilled in the art can modify or change the above embodiments without departing from the spirit and scope of the present disclosure. Therefore, all equivalent modifications or changes made by those of ordinary skill in the art without departing from the spirit and technical ideas disclosed by the present disclosure should fall within the scope of the claims of the present disclosure.

What is claimed is:

1. A liquid cooling seal box, comprising
  a sealed heat conduction box body,
  wherein an inner cavity of the heat conduction box body includes a heating device and an insulating liquid in which the heating device is immersed,
  the insulating liquid absorbs heat of the heating device and vaporizes, vaporized steam rises to the top of the inner cavity of the heat conduction box body to be cooled and liquefied, and a liquefied insulating liquid falls back into the insulating liquid at the bottom of the inner cavity,
  wherein the heat conduction box body comprises:
    a box cover;
    a box body, sealed and locked with the box cover to form the sealed heat conduction box body;
    an air-tight joint, disposed on a side wall of the box body, and configured to electrically communicate the liquid cooling seal box with outside, supply the insulating liquid to the liquid cooling seal box, and vacuum the liquid cooling seal box; and
    a safety valve, disposed on a side wall of the box body, and configured to release air pressure in the inner cavity of the heat conduction box body.

2. The liquid cooling seal box as in claim 1, wherein the box cover is a cold plate, an edge of the cold plate includes a fixing hole, and the cold plate is locked and sealed with the box body through the fixing hole and a fixing member.

3. The liquid cooling seal box as in claim 2, wherein a sealing surface of the box cover includes a condenser coil, and a joint of the condenser coil is disposed on an outer surface of the box cover.

4. The liquid cooling seal box as in claim 3, wherein the box cover has a flange structure, and a top side face of the flange structure includes a liquid cavity.

5. The liquid cooling seal box as in claim 1, wherein a top edge of the box body includes a trench, and a sealing gasket is filled in the trench.

6. The liquid cooling seal box as in claim 1, wherein the box body is a cold plate shell.

7. The liquid cooling seal box as in claim 1, wherein the air-tight joint has a detachable panel structure.

8. The liquid cooling seal box as in claim 1, wherein the air-tight joint comprises an RJ45 sealing joint, an optical fiber sealing joint, a power sealing joint, a vacuuming joint, or/and a liquid adding opening.

9. The liquid cooling seal box as in claim 1, wherein the inner cavity of the heat conduction box body includes a liquid level meter, a pressure sensor, or/and a temperature sensor.

* * * * *